United States Patent

[11] 3,611,121

| [72] | Inventors | Joseph Vild<br>Lyndhurst;<br>Edward J. Slupek, Mayfield Heights, both of Ohio |
|---|---|---|
| [21] | Appl. No. | 789,204 |
| [22] | Filed | Jan. 6, 1969 |
| [45] | Patented | Oct. 5, 1971 |
| [73] | Assignee | Republic Steel Corporation<br>Cleveland, Ohio |

[54] EDDY CURRENT DEFECT DETECTOR AND MARKING DEVICE
10 Claims, 4 Drawing Figs.

[52] U.S. Cl. .................................................... 324/37, 324/40
[51] Int. Cl. ........................................................ G01r 33/12
[50] Field of Search ........................................... 324/34, 37, 40; 73/67.5, 67.6, 67.7, 67.8, 67.9

[56] References Cited
UNITED STATES PATENTS

| 2,423,891 | 7/1947 | Kellerman | 324/34 |
| 3,056,081 | 9/1962 | Hochschild | 324/37 |
| 3,281,667 | 10/1966 | Dobbins et al. | 324/40 |
| 3,319,160 | 5/1967 | Wood et al. | 324/40 |
| 3,418,567 | 12/1968 | Mandula et al. | 324/37 |
| 3,469,182 | 9/1969 | Wycherly et al. | 324/37 |
| 3,437,810 | 4/1969 | Wood et al. | 324/37 |

FOREIGN PATENTS

| 594,158 | 11/1947 | Great Britain | 324/40 |

OTHER REFERENCES

Allen, J.; " Eddy Current Testing in Practice." Oak Ridge National Laboratory; U.S. Atomic Energy Commission; Metallurgy Division; ORNL– 2655; April 30, 1959; pp. 37– 38 (Copy in 324– 40)

Primary Examiner—Rudolph V. Rolinec
Assistant Examiner—R. J. Corcoran
Attorneys—Robert P. Wright and Joseph W. Malleck ABSTRACT: In eddy current defect detecting and marking apparatus, a plurality of search coils are mounted for rotation about a longitudinal axis coincident with the axis of an elongated article being inspected. The search coils are all energized by one oscillator and are so arranged that there is no interaction between them and the oscillator. Output signals from the plurality of search coils are sent through an equal plurality of processing channels, are then partially combined to actuate a recorder, and fully combined to actuate a marking device for physically marking on the article itself the approximate location of a detected defect.

PATENTED OCT 5 1971 3,611,121

INVENTORS.
JOSEPH VILD
EDWARD J. SLUPEK
BY Watts, Hoffmann,
Fisher & Heinke
ATTORNEYS

PATENTED OCT 5 1971

INVENTORS.
JOSEPH VILD
BY EDWARD J. SLUPEK
Watts, Hoffmann,
Fisher & Heinke
ATTORNEYS.

EDDY CURRENT DEFECT DETECTOR AND MARKING DEVICE

CROSS-REFERENCES TO RELATED PATENTS AND APPLICATIONS a. U.S. Pat. No. 2,660,704 issued Nov. 24, 1953 to W. C. Harmon et al. for "Seam Depth Indicator";

b. U.S. Pat. No. RE 26,286, reissued Oct. 17, 1967 to W. C. Harmon for "Method and Apparatus for Inspecting Workpieces which are Relatively Independent of Probe Motion";

c. U.S. Pat. No. 3,418,567, issued Dec. 24, 1968 to J. M. Mandula et al. for "Magnetic Flaw Detector System with Marking Fluid Applicator Operable by Variable Pressure of a Control Fluid" and assigned to the assignee of the present invention;

d. U.S. application, Ser. No. 793,652, filed on Jan. 24, 1969 by J. M. Mandula et al. for "Method and Apparatus for Detecting and Marking Defects in Articles," and assigned to the assignee of the present invention;

e, U.S. application, Ser. No. 789,159, filed on Jan. 6, 1969 by J. Vild for "Logic Circuit for Defect Detecting and Marking Apparatus," and assigned to the assignee of the present invention.

BACKGROUND OF THE INVENTION

1. Field of the Invention

This invention relates to eddy current defect-detecting and marking apparatus, and more particularly, to such apparatus embodying a plurality of search coils that rotate about an elongated article, such as a bar or pipe, being inspected.

2. Discussion of the Prior Art

The technique of eddy current detection of flaws in metal articles is well known in the prior art. It involves moving a test coil closely over the material being tested. The coil is energized by an oscillator and generates eddy currents in the steel or other metal being tested. When a flaw in the metal is encountered, the loading of the search coil is decreased, and, therefore, the output of the oscillator is increased. This variation in oscillator output is detected and utilized to control signalling or classifying apparatus. In some types of apparatus, the article being tested may be classified according to the severity of the defect, while in other types merely the presence of a defect of greater than a predetermined severity will serve to make the article unusable.

When testing cylindrical articles such as rods or pipes, it has heretofore been customary to maintain the search coil or probe in a fixed position and rotate the cylindrical article about its axis as it moves past the search coil. This has required the provision of complex mechanical equipment for simultaneously rotating the article being tested about its axis while moving it axially past the search unit. In addition, there remains a possibility that a flaw will be undetected because it does not lie on the helical path traced by the search coil.

Accordingly, it is a general object of the present invention to provide apparatus in which a cylindrical article being tested does not need to be rotated, and which provides increased accuracy over that heretofore attainable in detecting and marking the locations of flaws.

SUMMARY OF THE INVENTION

A plurality of search coils are mounted for rotation about an axis coincident with a longitudinal axis of an elongated article being inspected. The search coils are all energized by a single oscillator, and are so buffered that there is no interaction between them and the oscillator; that is, the output of the oscillator is of essentially constant amplitude. Each search coil acts as a variable impedance between two amplifiers, and when a flaw is detected the impedance of the search coil is increased.

Each search coil is connected in an individual signal processing channel, which detects any change in amplitude of the signal from the search coil due to a defect being encountered. When utilizing four search coils, detected signals from two of the channels are combined and provided to one track of a two-track recorder, and signals from the other two channels are combined and provided to the second track of the recorder. All four detected signals are combined and utilized to actuate a marking device, such as a marking fluid applicator, to physically mark on the article itself the approximate location of a detected defect.

Various indicators are provided for indicating when a search coil has failed or become disconnected and when the magnitude of a defect exceeds a predetermined level. In addition, signals are provided through additional tracks of the recorder for marking on the record those defects that exceed the predetermined level.

DESCRIPTION OF A PREFERRED EMBODIMENT

Figure 1:
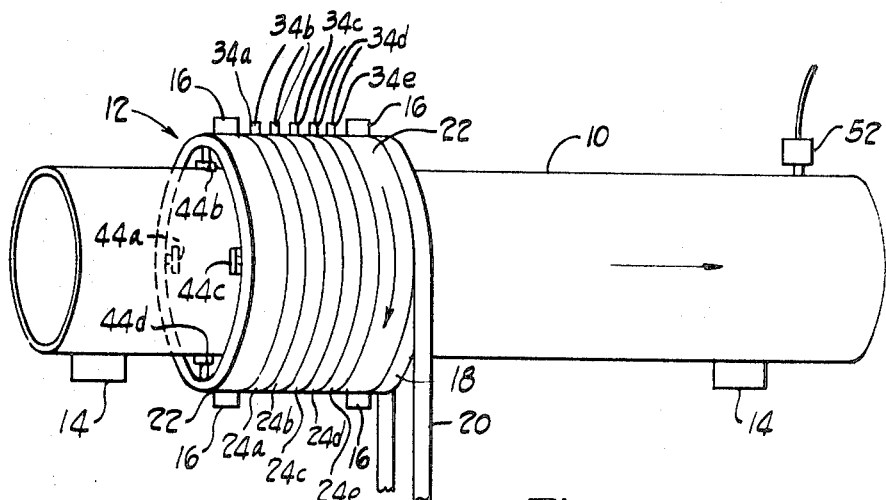
FIG. 1 is a diagrammatic perspective view illustrating an arrangement of search coils in apparatus embodying the invention.

FIG. 1 shows an elongated article 10, such as a bar or pipe, being inspected for defects by means of an eddy current detection technique. The article 10 is moving in a direction from left to right, as seen in the drawing, and passes through a circular rotatable drum mechanism, indicated generally by the numeral 12. The cylindrical article 10 is supported and moved axially by conventional conveyor mechanism shown diagrammatically at 14. The drum mechanism 12 is supported for rotation in conventional bearings 16 and includes a pulley 18 at one end. The pulley 18 may be integral with the drum or may be secured to it by conventional means. The mechanism 12 is rotated by means of a belt 20 engaging the pulley 18 and conventionally driven by means such as a motor (not shown).

The mechanism 12 includes two circular bearing rings 22 which are engaged by the bearings 16, and five sliprings 24a–e. The sliprings 24 are, of course, insulated from each other and from the bearing rings 22. The sliprings 24a–e are respectively contacted by brushes 34a–e.

Mounted 90° apart inside the device 12 are four search coils 44a–d. The search coils 44a–d may be of the type disclosed in the reference U.S. Pat. No. 2,660,704. They are spring mounted by conventional means and ride against the outer surface of the article 10 being inspected. One end of the search coil 44a is electrically connected to the slipring 34a, and the search coils 44b, c, d, are similarly respectively connected to the sliprings 34b, c, d. The remaining ends of the search coils 44a–d are connected together and to the slipring 34e, which is a common or grounded connection. Signals from the sliprings 34a–d are provided to processing channels to be later described and, after processing, are utilized to actuate a marking device 52 located "downstream" of the rotating mechanism 12. The marking device 52 is fixed in position, and the signals from the search coils 44a–d are delayed in time by a sufficient amount to actuate the marking device to accurately mark on the article being inspected the axial position of any defect detected.

The mechanical and structural details of the apparatus shown in FIG. 1 are fully set forth in the reference application U.S. Ser. No. 793,652, which is incorporated herein by reference.

The marking device 52 may be of the fluid-marking type disclosed in the referenced application, Ser. No. 287,987, or may be of a conventional commercially available type. It need not be a fluid marking device but may be a cutting device for producing a nick or groove in the article being inspected.

Figure 2:
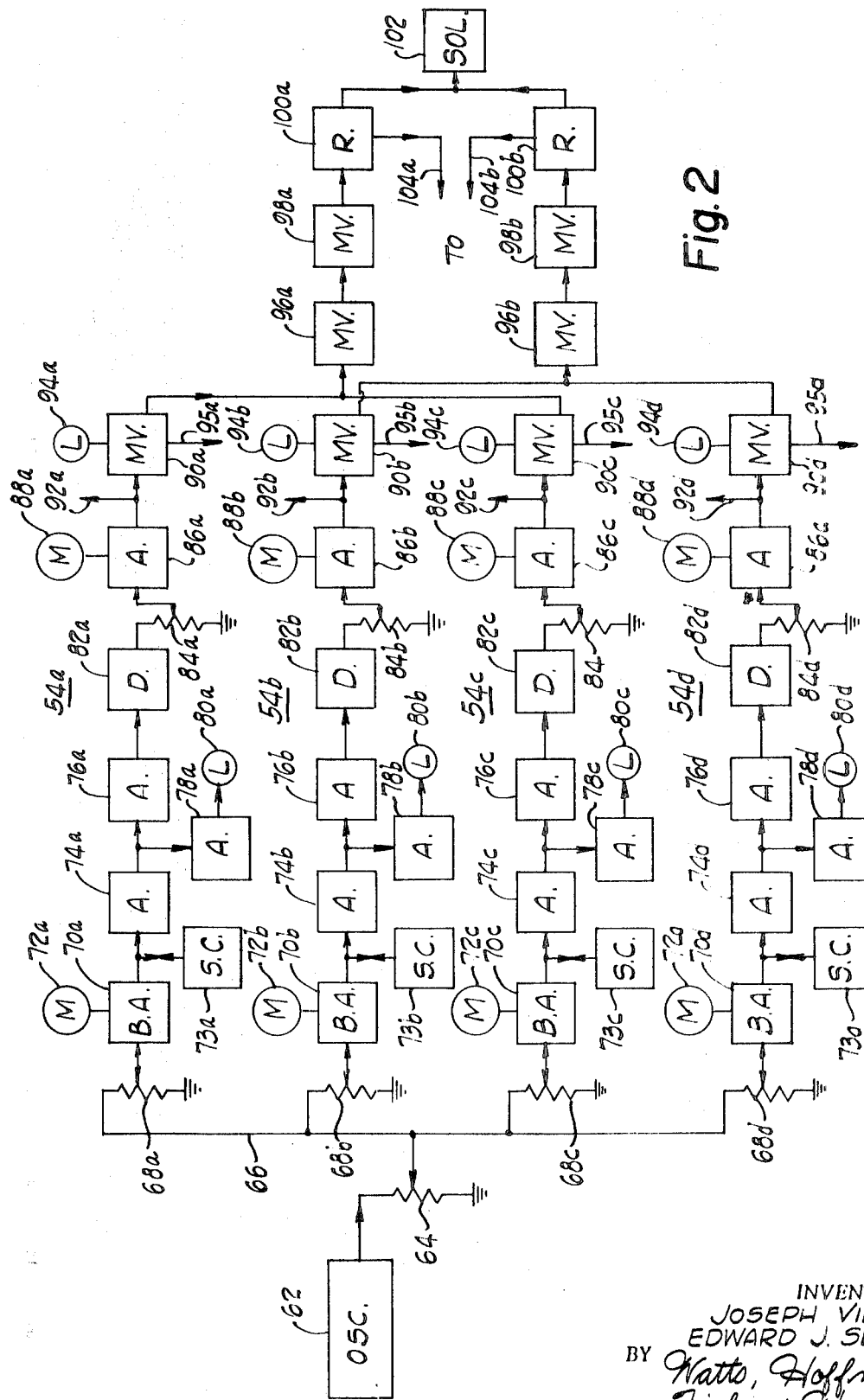
FIG. 2 is a block diagram of eddy current detection equipment embodying the invention.

FIG. 2 is a block diagram of the electronic portion of apparatus embodying the invention. As shown, it includes four signal processing channels 54a, b, c, d, corresponding to the four search coils 44a–d. The channels 54a–d are connected in parallel and all receive signals from an audio frequency (AF) oscillator 62. The oscillator 62 is of conventional design and provides output signals in an adjustable frequency range of 10-12 kilocycles per second across a potentiometer 64.

The movable arm of the potentiometer 64, from which the output signals of the oscillator 62 are derived, is connected to a lead 66, which is in turn connected to one end of each of four potentiometers 68a, b, d, c. The potentiometers 68 are connected in parallel to the lead 66, and their other ends are all grounded. The potentiometer 64 serves as a master oscillator gain control, and the potentiometers 68 serve as individual oscillator gain controls for the four channels 54. The latter controls for the individual channels are necessary because of possible differences in amplification factors and other fixed parameters of the four channels. The controls 68 are used when calibrating the apparatus, as will be explained later in detail.

Inasmuch as the four processing channels of the apparatus are identical as to components and functions, only one will be described in detail. Corresponding components in the four channels are identified by the same reference numeral, but with suffixes a, b, c, d respectively denoting the four different channels.

Each of the potentiometers 68 has a movable arm which, as previously mentioned, may be adjusted in a calibration process to insure that all four search coils receive equal output from the audio oscillator. The adjustable arm of each potentiometer 68 is electrically connected to the input of a buffer amplifier 70. The amplitude level of the output of the buffer amplifier 70 is indicated by a level meter 72 as will be explained in detail with reference to FIG. 3.

Output signals from the buffer amplifier 70 are provided to a search unit 73 and to an amplifier 74. Each search unit 73 includes a parallel combination of the search coil 44 and a variable capacitor. The search unit 73 serves as a variable impedance which varies with the eddy current distribution in the article being tested. For example, if there are no flaws in the article being tested, a certain amount of energy will be absorbed by the search unit 73. If a flaw is detected, the impedance of the search unit increases, and the amplitude of the energy transmitted to the amplifier 74 will increase, although the amplitude increase is small and must be amplified to be usable.

The frequency of the output signals of the oscillator 62 is adjustable in the frequency range from 10 to 12 kc. per second. The search coil 44 and its associated capacitor are turned to provide a condition whereby movement of the search coil toward and away from the article being inspected produces a minimum difference in the amplitude of the energy which is fed to the amplifier 74. This adjustment technique is fully explained in the specification (and FIG. 2) of the referenced U.S. Pat. No. RE 26,286.

The amplifier 74 is a combination grid leak and cathode-biased audio frequency amplifier. Its output signals are delivered to a second similarly biased amplifier 76 and to a "-coil fail" amplifier 78. If a failure occurs in the coil 44, the output signals of the amplifier 74 will decrease by a relatively great amount, because of the considerable detuning of the search unit 73. The amount of decrease in the output of the amplifier 74 is relatively large. The amplifier 78 is essentially a threshold device which senses this large decrease in amplitude and energizes a lamp 80 to indicate a defect in the sensing coil. Once a lamp 80 is energized, it remains energized until a reset switch is actuated. This will be explained in detail in connection with FIG. 3.

Signals from the amplifier 76 are provided to a conventional detector 82. The detector 82 rectifies the 10-12 kc. AF signals from the amplifier 76 and provides direct current output signal pulses across a potentiometer 84. If a defect is encountered in the article being inspected, a positive-going pulse signal will appear across the potentiometer 84. A movable arm of that potentiometer is connected to provide a signal to an input of a pulse amplifier 86. The four potentiometers 84a–d serve as individual gain controls for the four channels 54a–d. The purpose of the pulse amplifier 86 is primarily to eliminate noise signals and other low-level spurious signals that do not indicate a defect in the article being tested. To this end, each amplifier 86 is provided with an adjustable threshold control (not shown in FIG. 2). The level at which the threshold of each pulse amplifier 86 is set is indicated by a meter 88. The amplifiers 86 are illustrated in detail in FIG. 4.

Positive-going pulse output signals from the pulse amplifiers 86 are provided to one-shot multivibrators 90 and to leads 92. The leads 92 are connected through a selector switch to a strip chart recorder, as will be explained in detail in connection with FIG. 4. Each of the multivibrators 90 is provided with an indicator light 94, which is energized simultaneously with energization of its corresponding multivibrator 90. When the lamp 94 is illuminated, it indicates the detection of a flaw.

Negative-going pulse output signals from the multivibrators 90 are also provided on leads 95. The leads 95 may be connected as input leads to logic circuitry for a multiple-marker system, such as is disclosed in the referenced application, Ser. No. 789,159. In the present invention utilizing a single marking device 52, the leads 95 would not be used.

Output signals from the multivibrators 90a and 90c are combined and provided as an input signal to a one-shot multivibrator 96a. Similarly, output signals from the multivibrators 90b and 90d are combined and provided as an input signal to a one-shot multivibrator 96b. The multivibrators 96 serve to provide time delays to permit a detected defect to progress from the position of the search coils 44 to the position of the marking device 52 (FIG. 1). The width of the pulses produced by the multivibrators 96 is, of course, adjustable and is dependent upon the axial speed of travel of the article 10 being inspected. The output signals of the multivibrators 96a, 96b are respectively provided to second one-shot multivibrators 98a, 98b. The purpose of the multivibrators 98 is to energize the marking device 52 (FIG. 1) for a predetermined length of time to make a visible mark on the article being inspected. The multivibrators 98 are triggered by the trailing edges of the pulses produced by the one-shot multivibrators 96.

The reasons for combining the signals from channels 54a and 54c rather than from channels 54a and 54b are of the inherent limitations of the multivibrator 96 and the mechanical orientation of the search coils. The multivibrator 96 will not accept another input signal during the period that it is timing. However, a flaw of appreciable length may cause a chain of defect pulses to appear at the outputs of multivibrators 90a, 90b, 90c, 90d in that order. By applying the outputs of 90a and 90c to multivibrator 96a and the outputs of multivibrators 90b and d to 96b, the train of pulses would then be routed alternately to 96a and 96b. This method allows the system to accept a second defect pulse while the time delay cycle from the first is being completed.

The output signals of the multivibrators 98 respectively actuate relays 100a, 100b. When either of the relays 100 is actuated, it energizes a solenoid 102 that controls the marking device 52 shown in FIG. 1. When the relays 100 are energized they also provide signals on respective output leads 104. The signals on the leads 104 are supplied to the recorder to mark on the strip chart those events (defects) that caused energization of the marking device 52.

Figure 3:
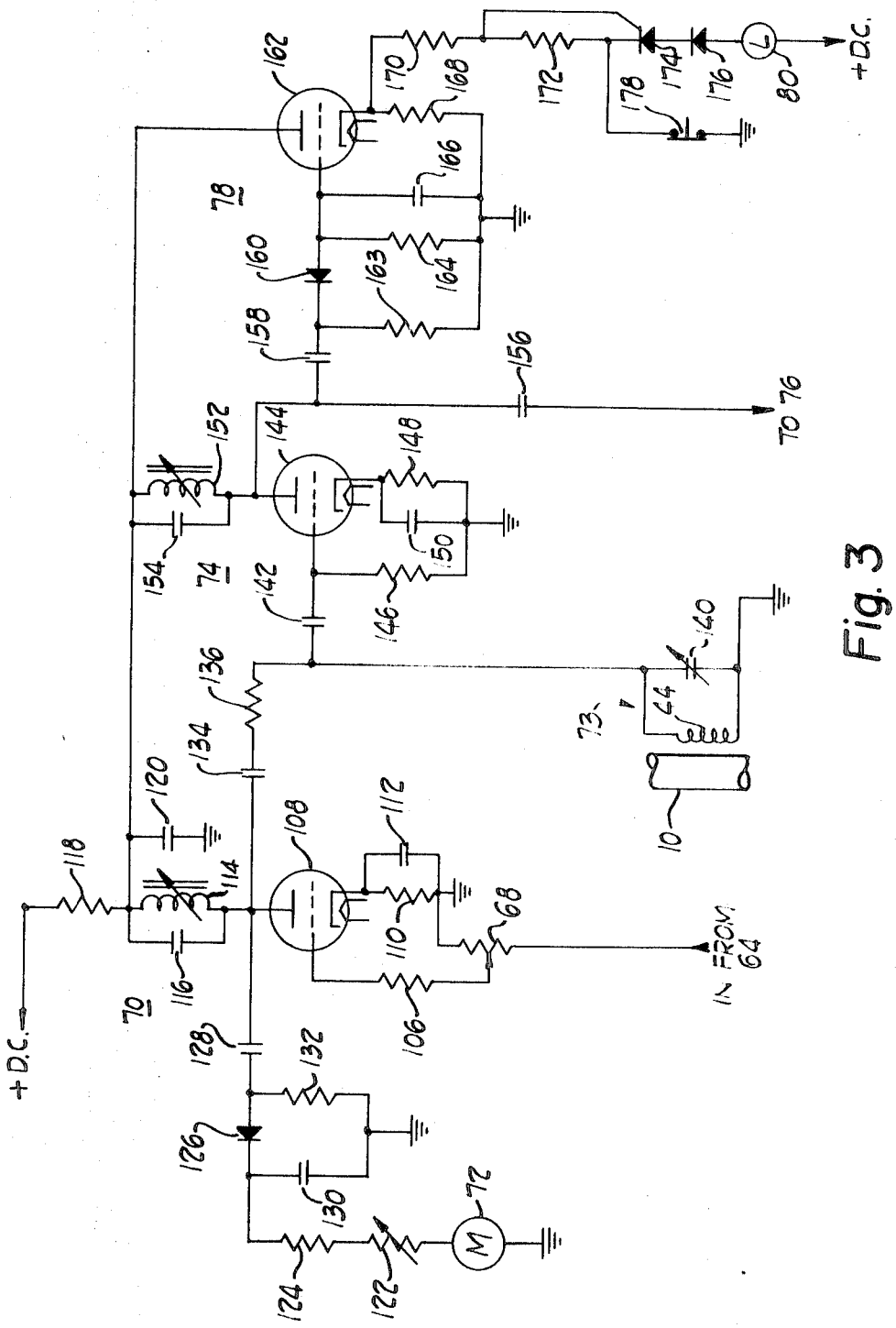
FIG. 3 is a schematic diagram showing the connection of a search coil and a coil failure indicating portion of the apparatus.

FIG. 3 shows in schematic form the buffer amplifier 70, the search coil 44, the search unit 73, the amplifier 74 and the coil fail amplifier 78 of any one of the four channels 54 shown in FIG. 2. As shown, the output signal from the movable arm of the potentiometer 64 is supplied to one end of the potentiometer 68, the other end of which is grounded. The movable arm of the potentiometer 68 is connected through a resistor 106 to the control grid of a conventional triode vacuum tube 108, such as a Type 7895 tube. The cathode of the tube 108 is connected to ground through a resistor 110 and a capacitor 112 connected in parallel to provide cathode bias. The plate of the triode 108 is connected to a +DC supply (not shown) through a tuned circuit comprising a variable inductor 114 connected in parallel with a capacitor 116, with the combination being connected in series with a resistor 118. A juncture of the variable inductor 114 and the resistor 118 is connected to ground through a decoupling capacitor 120, which serves to keep any alternating current signals from being fed back to the +DC supply.

One side of the oscillation level meter 72 is also connected to the plate of the tube 108 through a series circuit comprising a variable resistor 122, a fixed resistor 124, a diode rectifier 126, and a capacitor 128. A capacitor 130 is connected between the cathode of the diode 126 and ground, and a resistor 132 is connected between the anode of the diode 126 and ground. The diode 126, the capacitor 130, and the resistor 132 act as rectifier means to provide direct current signals to the meter 72 (microammeter) to indicate the amplitude of the oscillations appearing at the plate of the tube 108.

Oscillations appearing at the plate of the tube 108 are coupled through a capacitor 134 and an isolation resistor 136 connected in series to the search unit 73. The search unit 73 comprises the search coil 44 and a variable capacitor 140 connected across the coil. The capacitor 140 is adjusted so that the search unit 73 is tuned approximately to resonance. In that case, in the absence of a flaw in the article 10 being inspected, a certain portion of the output voltage of the tube 108 is developed across the search unit 73. That voltage is also transferred through a capacitor 142 to the control grid of a triode vacuum tube 144 in the amplifier 74. The tube 144 may also be a Type 7895 tube.

If now a defect in the article 10 being inspected passes by the search coil 44, the eddy current pattern set up in the article by the coil is disturbed. When that happens, the voltage of the search unit 73 increases slightly and more energy is consequently transmitted to the tube 144 through the capacitor 142.

In the amplifier 74, an input signal is transferred through the capacitor 142 and appears across a grid leak biasing resistor 146 connected between the control grid of the tube 144 and ground. The cathode of the tube 144 is connected to ground through a biasing resistor 148 which is shunted by a capacitor 150. The plate of the tube 144 is connected to the +DC supply through the resistor 118 and through a parallel combination of a variable inductor 152 and a capacitor 154 connected in series with the resistor 118. The inductor 152 and the capacitor 154 form a tuned circuit which is, of course, tuned to the frequency of oscillations provided to the buffer amplifier 70 from the potentiometer 64.

An output signal from the amplifier 74 is taken from the plate of the tube 144 and connected through a coupling capacitor 156 to the input of the amplifier 76. A second output signal is also taken from the plate of the tube 144 and provided through a coupling capacitor 158 and a diode 160 to the control grid of a triode vacuum tube 162, such as a Type 7895 tube. The latter signal is utilized to actuate the coil fail lamp 80.

Amplifiers 74 and 76 have been designed to minimize test coil voltage variations resulting from harmless variables in the material being tested. Test coil voltage variations due to harmful flaws are usually abrupt, while those caused by harmless variables almost always occur at a much slower rate. The magnitude of the RC time constant of the capacitor 142 and the resistor 146 in the grid leak biasing circuit of the tube 144 in the amplifier 74 has been selected to bias out slow variations in the applied voltage, while permitting rapid changes to be amplifier. A similar grid leak biasing system is also used in the amplifier 76.

It is pointed out that when a flaw is encountered and the search unit 73 is affected, the signal provided to the control grid of the tube 144 in the amplifier 74 increases. This means that the signal provided from the plate of the tube 144 through the capacitor 158 and the diode 160 to the control grid of the tube 162 increases. The opposite effect occurs if the search coil 44 develops a defect, such as being disconnected from the remainder of the circuit. In the latter case, the signal provided to the tube 144 decreases in magnitude by a substantially greater amount than when a flaw is detected. This is reflected in a substantial decrease in the signal provided to the tube 162. In normal operations, the tube 162 is slightly conductive.

Looking specifically at the connections of components in the amplifier 78, it is seen that the cathode of the diode 160 is connected to ground through a resistor 163, and its anode is similarly connected through a resistor 164. A capacitor 166 is connected across the resistor 164. The cathode of the tube 162 is also connected to ground through a resistor 168. The anode of the tube 162 is connected to the +DC supply through the load resistor 118.

The coil lamp 80 is connected in the cathode circuit of the tube 162. The cathode of the tube is connected to one end of a resistor 170, which is connected in series with another resistor 172 to the cathode of a silicon control rectifier (SCR) 174. The anode of the SCR 174 is connected to the cathode of a diode 176, whose anode is connected to one side of the lamp 80. The other side of the lamp 80 is connected to a relatively low voltage positive DC source (not shown), such as a filament supply. The gate or control electrode of the SCR 174 is connected to a juncture of the resistors 170, 172. The cathode of the SCR 174 is also connected to ground through a normally closed, manually operable, pushbutton switch 178, which acts as a "reset" switch.

As previously mentioned, when the system is operating normally, the tube 162 is slightly conductive. The amount of current through the resistors 170, 172 is not sufficient, however, to bias the control electrode of the SCR 174 sufficiently positive with respect to its cathode to cause the SCR to conduct. However, if the search coil 44 fails, the signal present on the grid of the tube 162 will decrease considerably (become less negative) and cause the tube 162 to increase its conduction. This will cause an increased voltage drop across the resistor 172 and make the control electrode of the SCR 174 sufficiently positive with respect to the cathode of the SCR to trigger it. When the SCR 174 is triggered, current flows from the +DC source through the lamp 80, the diode 176, the SCR 174, and the switch 178 to ground. This illuminates the lamp 80, and it remains in that condition until the current path is broken by momentarily opening the switch 178. Thus, even if the search coil fails momentarily, the indicator lamp 80 will be illuminated and will remain in that condition until it is noticed by an operator, who will then check the search coil, correct the failure (if any), and open the switch 178.

Figure 4:
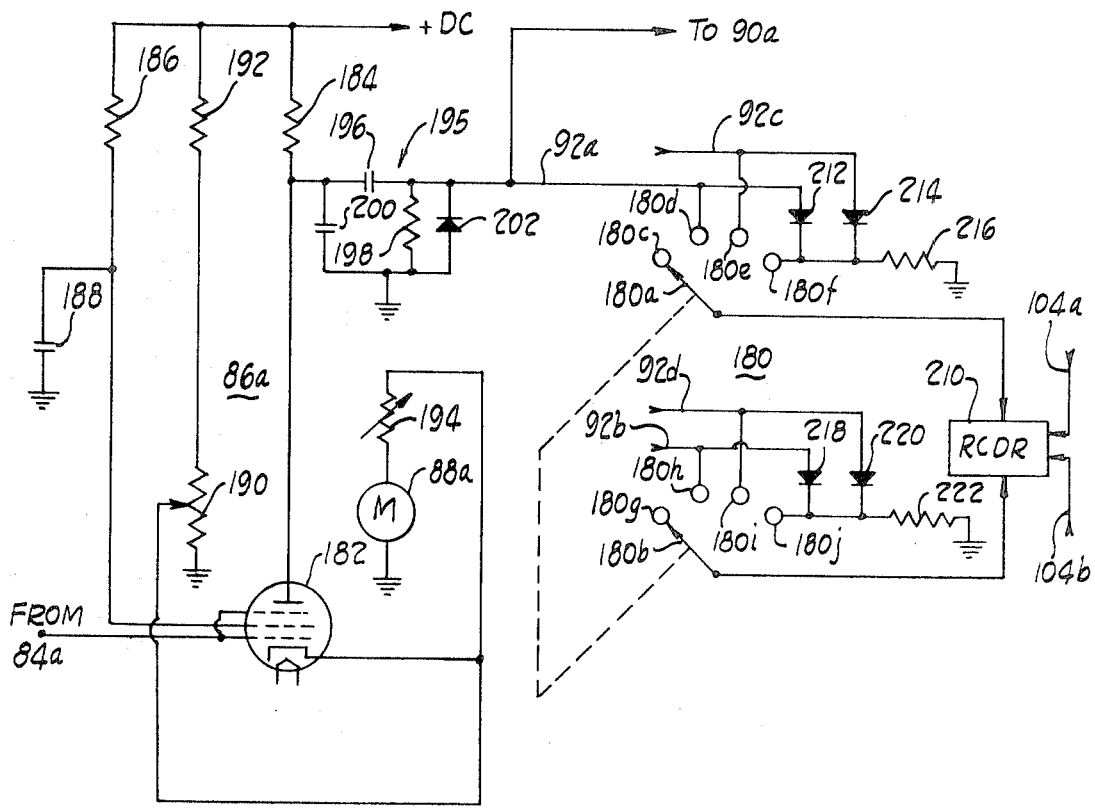
FIG. 4 is a schematic diagram showing a pulse amplifier and connections to a recorder.

FIG. 4 is a schematic diagram of one of the pulse amplifiers 86 and the connections to a recorder selector switch 180. For purposes of illustration the amplifier 86a is shown in FIG. 4, although it is understood that all of the amplifiers 86 are identical. One selector switch 180 is utilized and the connections of the various other amplifiers 86 to the selector switch are shown in FIG. 4.

As shown in FIG. 4, the pulse amplifier 86a comprises a pentode vacuum tube 182, such as Type 6BN6 tube. The suppressor grid of the tube 182 is connected directly to the control grid. The plate of the tube is connected through a load resistor 184 to the +DC supply. The screen grid of the tube 182 is also connected to the +DC supply through a resistor 186, and is connected to ground through a capacitor 188. The cathode of the tube 182 is connected to a movable arm of a potentiometer 190, which potentiometer is connected in series with a fixed resistor 192 between the +DC supply and ground. Thus, the cathode of the tube 182 is provided with a positive bias that varies according to the setting of the movable arm of the potentiometer 190. The cathode of the tube 182 is also connected to ground through a variable calibration resistor 194 and the meter 88a (microammeter). The meter 88a reflects the cathode bias of the tube 182, and may be calibrated to indicate the amplitude level of input signals to the amplifier 86a required to cause the tube 182 to conduct.

The tube 182 is normally biased into a nonconductive state. When a defect is encountered in the article being inspected, a positive-going signal is provided to the control grid of the tube 182 from the movable arm of the potentiometer 84a. If the signal provided to the control grid is of sufficient magnitude, the tube 182 will conduct. When this occurs, a negative-going pulse will appear at the plate of the tube.

The negative-going pulse signal appearing on the plate of the tube 182 is provided to the selector switch 180 through a differentiating circuit shown generally by a numeral 195. The differentiating circuit 195 includes a capacitor 196 having one side connected to the plate of the tube 182 and the other side connected to ground through a resistor 198. A high-frequency filter capacitor 200 is connected from the plate of the tube 182 to ground. A diode 202 is connected across the resistor 198, and is so poled as to remove the negative-going portion of the differentiated output signal obtained from the plate of the tube 182. Thus, a positive-going pulse signal appears across the resistor 198 and is provided to the multivibrator 90a and to the selector switch 180.

The selector switch 180 is a ganged, two section switch having four contacts in each section and poles 180a, 180b. One section has four contacts 180c, 180d, 180e, 180f and the other section has four contacts 180g, 180h, 180i, 180j. When the switch is in the position shown, it is in its "off" position, because the contacts 180c, 180g are unconnected.

The poles 180a, 180b of the switch 180 are connected to a recorder 210. The invention is not limited to the use of any particular type of recorder. However, in practice it has been found that a recorder that is well suited to this particular application is one known as a "Dual Channel Ink Writing Recorder," Mark II, RD-2521-20, manufactured by Brush Instrument Division, Clevite Corporation, Cleveland, Ohio. That recorder is a two channel paper tape recorder that makes two ink recordings side-by-side on a strip chart. The poles 180a, 180b of the switch 180 are connected respectively to inputs of the two recording channels. The particular recorder mentioned also has two other channels which do not record amplitudes but only mark when their inputs are energized. The inputs to those latter two channels are respectively connected to the leads 104a, 104b to mark on the edges of the paper strip recording those defects that give rise to signals having more than a predetermined amplitude.

The output signal from the differentiating circuit 195 is connected directly to the switch contact 180d and through a diode 212 to the switch contact 180f. A positive-going signal from a similar differentiating network in the channel 54c is provided on the lead 92c to the switch contact 180e and through a diode 214 to the switch contact 180f. The diodes 212, 214 serve as isolating means to prevent a signal provided through one of the leads 92a, 92c from being reflected back through the other lead. The cathodes of both of the diodes 212, 214 are connected through a resistor 216 to ground, and the positive-going signals on the leads 92a, 92c appear across the resistor 216.

The second switch section is similarly connected with the signal on the lead 91b provided from the channel 54b being supplied to the switch contact 180h, and the signal from the channel 54d being supplied on the lead 92d to the switch contact 180i. The signals on the leads 92b, 92d are also respectively provided through diodes 218, 220 to the switch contact 180j. The signals on the leads 92b, 92d appear across a resistor 222 connected between the cathodes of the diodes 218, 220 and ground.

The principal purpose of the selector switch 180 is realized in calibrating the apparatus. Specifically, when the switch is in its second position with the poles 180a, 180b respectively engaging the contacts 180d, 180h, output signals from the search units 73a, 73b are respectively placed on the two recording tracks of the recorder 210. The various gain controls in the channels 54a, 54b may then be adjusted to provide signals of a desired amplitude to the recorder 210. Similarly, when switch 180 is in its third position with the poles 180a 180b contacting the contacts 180e, 180i, signals from the search units 73c, 73d are provided to the recorder. These channels may then be calibrated.

In its normal "operate" position, the switch 180 would be in its fourth position with the pole 180a engaging the contact 180f and the pole 180b engaging the contact 180j. In this mode of operation, the defect signals from the channels 54a and 54c are combined and provided to one channel of the recorder 210, and the signals from the channels 54b and 54d are combined and supplied to the other channel of the recorder.

It is now apparent that the invention provides apparatus that fulfills the stated objective. It not only accurately marks the axial location of a defect on a cylindrical article being inspected, but also provides a permanent record of signals indicating such defects and their magnitudes or severities. In addition, defects of greater than a predetermined severity are specially marked on the edges of the record.

Although only one embodiment of the invention has been shown and described, it is apparent that many changes and modifications may be made therein without departing from the scope and spirit of the invention.

We claim:

1. Eddy current defect-detecting and marking apparatus for inspecting an elongated article having a longitudinal axis, comprising:
   a. a plurality of search coils mounted for rotation about an axis substantially coincident with said longitudinal axis of said article and spaced apart radially about said axes;
   b. an oscillator connected to energize said plurality of search coils; a plurality of buffer amplifier means each coupling said oscillator to one of said search coils for isolating said search coils from said oscillator and each other;
   c. a plurality of signal processing channels equal in number to said plurality of search coils connected to receive signals from said oscillator respectively modified by said search coils, and respectively provide defect-indicating signals in response to a defect of greater than a predetermined severity being detected by a corresponding search coil;
   d. circuit means connected to receive said defect-indicating signals for combining said defect-indicating signals from said plurality of channels to provide actuating signals; and,
   e. marking means connected to receive said actuating signals and in response thereto mark on said article axial positions of detected defects.

2. The apparatus of claim 1, wherein said signal-processing channels include means for providing defect-indicating signals of substantially constant amplitude and time duration independent of defect severity greater than said predetermined severity.

3. The apparatus of claim 2, wherein each said signal-processing channel includes gain control means, whereby all said channels may be adjusted to have equal gains.

4. The apparatus of claim 3, wherein each said signal-processing channel further includes indicator means for indicating failure of its associated search coil.

5. Eddy current defect-detecting and marking apparatus for inspecting an elongated article having a longitudinal axis, comprising:
   a. first, second, third and fourth search coils mounted for rotation about an axis substantially coincident with said longitudinal axis of said article and equally spaced radially about said axes;
   b. an oscillator connected to energize all of said search coils; a plurality of buffer amplifier means each coupling said oscillator to one of said search coils for isolating said search coils from said oscillator and each other;
   c. first, second, third and fourth signal-processing channels connected to receive signals from said oscillator respectively modified by said first, second, third and fourth search coils, and respectively including i. first, second, third and fourth amplifier means for respectively providing first, second, third and fourth defect-indicating signals in response to a defect being detected by a corresponding search coil, the amplitudes of said defect-indicating signals being related to severities of detected defects, and ii. first, second, third and fourth output means for respectively receiving said first, second, third and fourth defect-indicating signals and respectively providing first, second, third and fourth marker signals in response to corresponding defect-indicating signals of greater than a predetermined amplitude;

d. circuit means connected to receive said marker signals from all said signal-processing channels and combine said marker signals to provide actuating signals; and e. marking means connected to receive said actuating signals and in response thereto mark on said cylindrical article axial positions of detected defects.

6. The apparatus of claim 5, further including a two channel recorder having two inputs, and switch means for selectively applying at least two of said defect-indicating signals respectively to said two inputs.

7. The apparatus of claim 6, wherein said switch means is actuatable to apply said first and second defect-indicating signals respectively to said two inputs.

8. The apparatus of claim 7, wherein said switch means is actuatable to apply said third and fourth defect-indicating signals respectively to said two inputs.

9. The apparatus of claim 8, wherein said switch means is actuatable to apply said first and third defect-indicating signals to one of said inputs and said second and fourth defect-indicating signals to the other of said inputs.

10. An eddy current defect-detecting and marking apparatus for inspecting an elongated article having a longitudinal axis, comprising:

a. a plurality of search coils mounted for rotation about an axis substantially coincident with the longitudinal axis of a said article and spaced radially from the surface of said article;

b. an oscillator connected to energize said plurality of search coils;

c. a plurality of first circuit means each coupling said oscillator to one of said plurality of search coils for energizing said plurality of search coils, each of said first circuit means including buffer amplifier means for substantially isolating a corresponding search coil from said oscillator;

d. a plurality of output circuit means each connected to a corresponding one of said search coils for providing defect-indicating signals in response to the detection by a corresponding coil of a defect having a severity exceeding a predetermined level;

e. second circuit means connected to said output circuit means to receive said defect-indicating signals for combining said defect-indicating signals to provide an actuating signal; and, f. marking means connected to said third circuit means to receive a said actuating signal for marking a said article in response to the receipt of a said actuating signal.